United States Patent
Logan

[15] 3,653,396
[45] Apr. 4, 1972

[54] CONVERTIBLE SOLENOID-ACTUATED, BALANCED SPOOL VALVE

[72] Inventor: Henry H. Logan, 6107 Newburg Avenue, Chicago, Ill. 60631

[22] Filed: Dec. 7, 1970
[21] Appl. No.: 95,713

[52] U.S. Cl............................................137/270, 251/324
[51] Int. Cl.............................................................F16k 3/24
[58] Field of Search ..................137/270, 269, 271; 251/321

[56] References Cited

UNITED STATES PATENTS

| | | | |
|---|---|---|---|
| 2,200,824 | 5/1940 | Herman | 137/270 |
| 2,606,571 | 8/1952 | Ernst | 137/270 |
| 2,662,543 | 12/1953 | Stacey | 137/269 X |
| 2,880,748 | 4/1959 | Elsey | 137/270 |
| 3,123,091 | 3/1964 | Elsey | 137/270 |

Primary Examiner—M. Cary Nelson
Assistant Examiner—Robert J. Miller
Attorney—Davis, Lucas, Brewer & Brugman

[57] ABSTRACT

A solenoid-actuated spool valve which can be converted from normally-open to normally-closed condition by removing a single access closure and reversing the valve spool.

12 Claims, 11 Drawing Figures

INVENTOR
Henry H. Logan
BY
Davis, Lucas, Brewer & Brugman
ATTORNEYS

Patented April 4, 1972

INVENTOR
Henry H. Logan
BY
Davis, Lucas, Brewer & Brugman
ATTORNEYS

Patented April 4, 1972
3,653,396
3 Sheets-Sheet 3
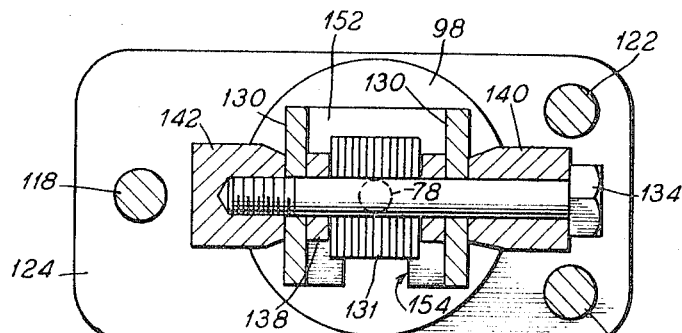
Fig. 6
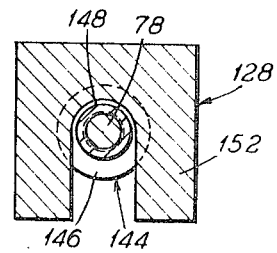
Fig. 7
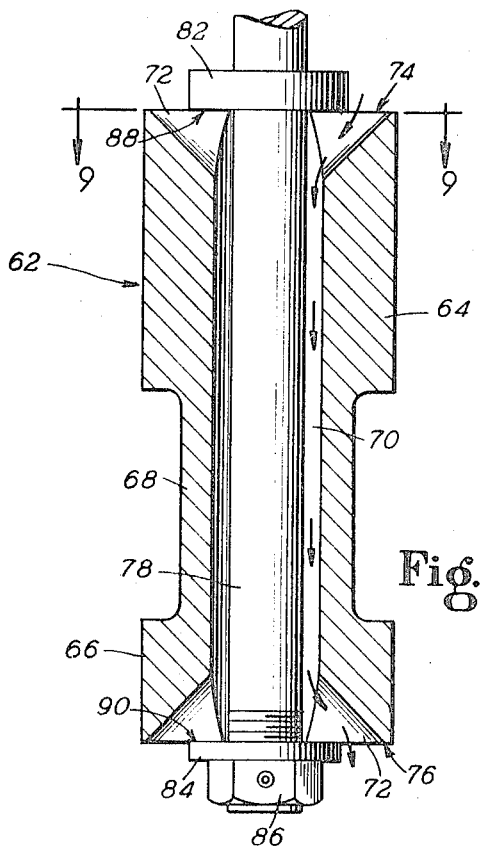
Fig. 8
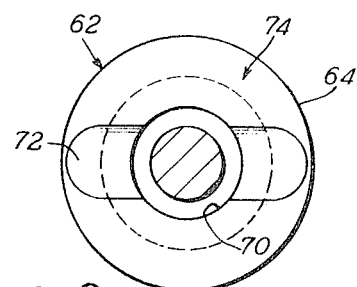
Fig. 9
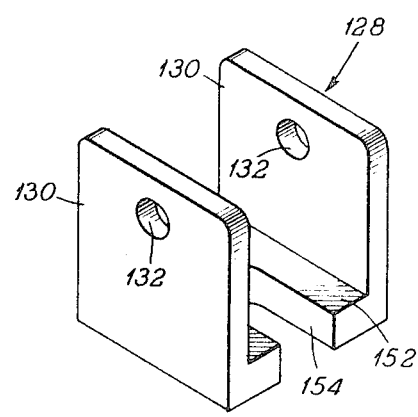
Fig. 11
Fig. 10
INVENTOR
Henry H. Logan
BY
Davis, Lucas, Brewer & Brugman
ATTORNEYS

CONVERTIBLE SOLENOID-ACTUATED, BALANCED SPOOL VALVE

BACKGROUND OF THE INVENTION

Conventional solenoid valves are manufactured either as normally-open or normally-closed types. This has required a separate inventory of each type where both are used.

Because of the difference in effective areas of the spool at the actuating shaft end and the opposite end, any appreciable pressure differential can cause unintended shifting of the spool in a conventional solenoid-actuated spool valve, and this can be hazardous to people, and dangerous to equipment, where safety requires that the valve remain either in an open or closed condition.

BRIEF SUMMARY OF THE INVENTION

The general object of this invention is to provide a solenoid-actuated spool valve which is readily convertible to normally-open or normally-closed service, so that a single such valve can be stocked and assembled for either service as required.

An important object of this invention is to provide such a solenoid-actuated spool valve which can be converted to normally-open or normally-closed type by a simple re-arrangement or easily accessible internal parts, using ordinary tools and mechanical techniques.

A specific object is to provide such a solenoid-actuated spool valve which can be converted by reversing the valve spool, end for end, and without adding or discarding any parts.

Another object is to provide a solenoid-actuated spool valve having improved, floating connections between the solenoid and an actuating shaft, and between the actuating shaft and the valve spool, to prevent binding between the movable parts.

Another object is to provide a solenoid-actuated spool valve having a high degree of reliability for use on fail-safe equipment because the pressure at both ends of the valve spool is balanced and at the level of the pressure in the outlet port, thereby positively preventing inadvertent shifting of the valve spool by pressure differential across its end portions.

Another object is the provision of such a valve in which the valve spool is biased in one direction by a combination of a spring and weights.

Other objects and advantages will be apparent from the following description taken in connection with the drawings in which:

FIG. 6 is a cross-section of FIG. 1, taken along the line 6—6;

FIG. 7 is a cross-section of FIG. 1, taken along the line 7—7;

FIG. 8 is an enlarged, fragmentary view of FIG. 1, showing details of the reversible spool assembly;

FIG. 9 is a cross-section of FIG. 8, taken along the line 9—9;

FIG. 10 is an enlarged, fragmentary, cross-sectional view of a bushing shown in FIG. 1; and FIG. 11 is a perspective view of a coupling shown in FIG. 1.

Like parts are designated by like reference characters throughout the figures of the drawings.

Figure 1:
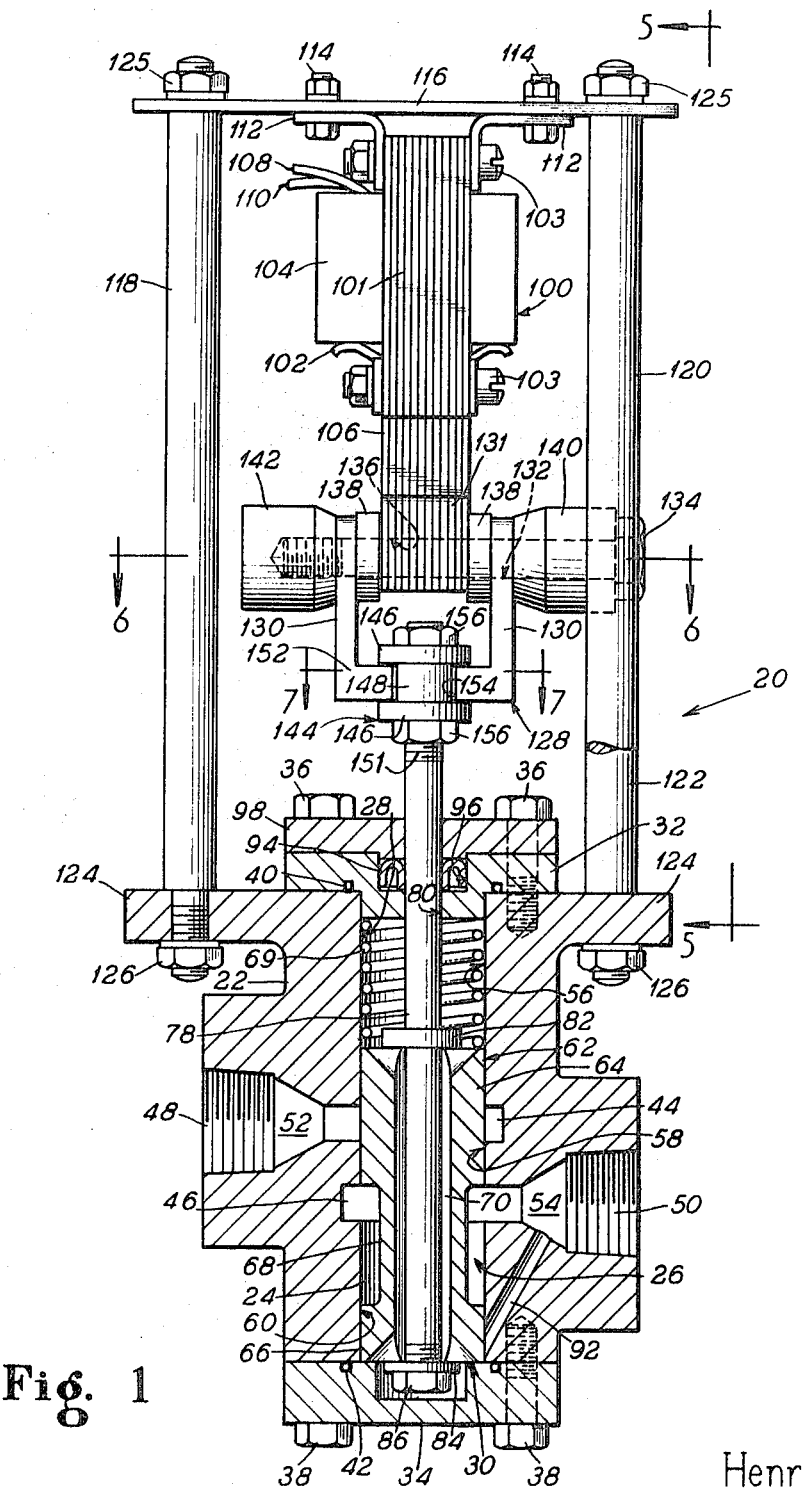
FIG. 1 is a side view, partly in vertical cross-section, of a preferred form of the present invention, shown as a normally-closed valve in normal, nonactuated, closed condition, the spool being disposed in what will be described as its upright or obverse orientation.

Referring now more particularly to the embodiment shown in the drawings, the improved solenoid-actuated valve is generally designated 20. It comprises a casing 22 having a vertical bore 24 defined by a cylindrical wall 26. The end portions 28 and 30 of the bore have top and bottom closure members 32 and 34. These are fastened by bolts 36 and 38, and are sealed by O-rings 40 and 42.

The casing 22 has first and second annular grooves 44 and 46. These are axially spaced apart in the bore wall 26, and are connected with inlet and outlet ports 48 and 50, via inlet and outlet passages 52 and 54, respectively. Each port is tapped, as shown, for connection with conventional threaded, external piping (not shown). Grooves 44 and 46 divide the bore wall into three significant cylindrical portions 56, 58 and 60.

Figure 2:
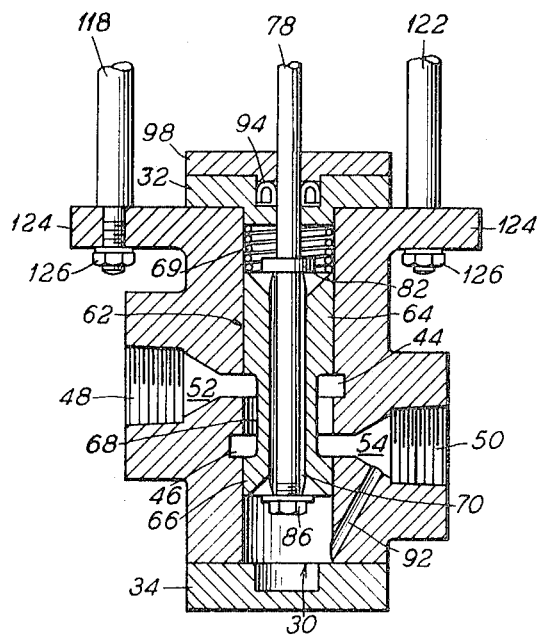
FIG. 2 is a fragmentary view of the normally-closed valve illustrated in FIG. 1, showing it in actuated, open condition.
Figure 3:
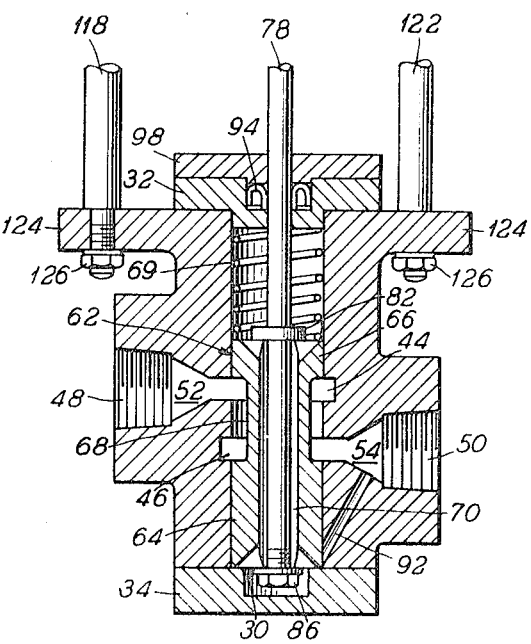
FIG. 3 is a fragmentary view of the valve illustrated in FIGS. 1 and 2, but with the spool re-assembled to show the valve as a normally-open type in normal, nonactuated, open condition, the spool being reversed and disposed in what will be designated as its upside-down or reverse orientation.
Figure 5:
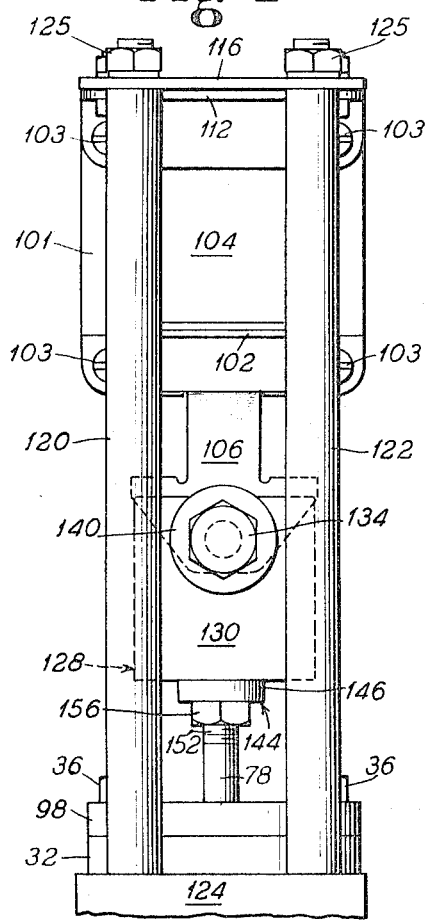
FIG. 5 is a fragmentary view of FIG. 1, taken in the direction of arrows 5—5.
Figure 4:
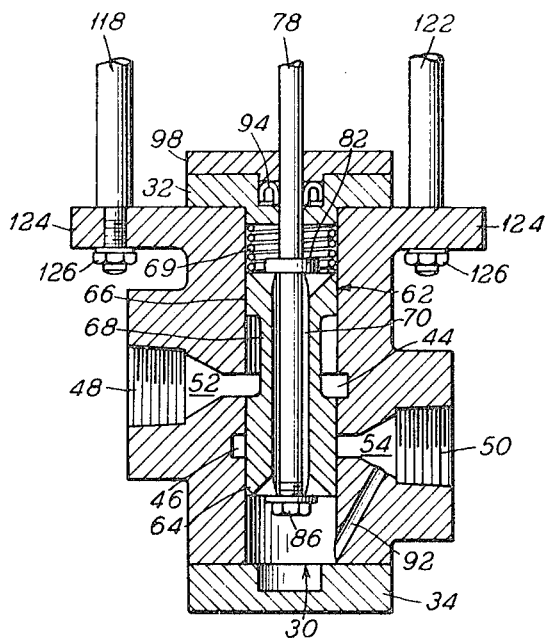
FIG. 4 is a fragmentary view of the normally-open type valve illustrated in FIG. 3, showing it in actuated, closed condition.

A valve spool 62 in the bore 24 is movable between a first, or lower, position as shown in FIGS. 1 and 3, and a second, or upper, position as shown in FIGS. 2 and 4.

The spool 62 has first and second cylindrical lands 64 and 66 slidably and sealably engaged with the bore wall 26. Lands 64, 66 flank a reduced diameter portion 68 which is sufficiently long in an axial direction to span the annular grooves 44 and 46, and the intermediate wall portion 58 therebetween, thereby interconnecting the inlet and outlet ports 48 and 50, as shown in FIGS. 2 and 3.

Spring means 69, between the closure member 32 and the spool, biases the spool toward its first position shown in FIGS. 1 and 3. As will be described subsequently, this may be augmented by gravity biasing means, and this will be especially useful where the valve is employed upright, or obverse, as shown in FIG. 1.

The spool 62 is formed with an axial passageway 70 (FIG. 8) extending from end to end. This passageway is diametrically widened at each end of the spool means by a transverse slot 72 formed in each of the end faces 74, 76. This enables fluid to move freely through the spool and to maintain a balanced pressure across the spool, as will be explained in more detail. Even the beginning of a pressure differential across the spool will be dissipated by the free movement of fluid through the spool, as shown by the arrows in FIG. 8.

An actuating shaft 78 extends through an opening 80 in closure member 32, and extends axially through the passageway 70 in the spool. The spool is retained between a fixed collar 82 and a removable collar, or washer, 84, held assembled by nut 86 threaded onto the end of the shaft 78.

The end surfaces 74 and 76 of the spool, and the contacting surfaces 88 and 90 of the collars 82 and 84 are normal to the axis of the spool. This permits the shaft 78 and the spool 62 to shift sidewise, within the clearance permitted by the oversized passageway 70, where necessary to accommodate, or compensate for, any inadvertent misalignment between these parts. This prevents binding or sticking when the spool is moved within the bore.

Thus, the oversize passageway 70 provides two valuable functions: First, it equalizes the pressure across the ends of the spool; and second, it enables the axes of the spool and shaft to shift laterally and eliminate binding. It will be appreciated that small magnitudes of shifting of these axes can be very effective in eliminating binding.

The casing 22 has a vent 92 which connects the bore end portion 30 with the outlet port 50. This feature, combined with the passageway 70 in the spool, maintains the pressure across the spool and in the ends of the bore at substantially the pressure in the outlet port.

A sealing gland or packing 94 is provided in a seat 96 in closure member 32. This surrounds the actuating shaft 78 and prevents fluid from leaking out along the shaft. The gland is retained by an apertured cover 98 fastened by the same bolts 36 which retain the closure member 32.

Solenoid means, generally designated 100, is supported on the casing 22 and is effective, when actuated, to move the spool 62 upward, against the bias of spring 69, to the valve second position shown in FIGS. 2 and 4.

The solenoid 100 may be conventional, with a frame 102, a coil 104 and a movable armature 106 which is drawn upward into stator laminations 101 in response to energization of the coil through the electrical conductors 108, 110. The solenoid frame 102 and laminations 101 are held assembled by bolts 103. The solenoid frame 102 is suspended by brackets 112 and bolts 114 beneath a cross-plate 116 which in turn is supported by three upstanding rods 118, 120 and 122, on casing flange 124. The ends of these rods are shouldered and threaded and held in place by nuts 125 and 126.

A U-shaped coupling 128 (FIG. 11) connects the solenoid armature lower or head portion 131 to the actuating shaft 78.

The coupling 128 has two spaced side plates 130, 130. These have pivot openings 132 journaled on a cross-bolt 134. The bolt is connected through a bolt hole 136 in the armature head 131. Washers or spacers 138, 138 are carried on the bolt 134 and center the armature between the coupling side plates 130, 130.

Weights 140 and 142, preferably of heavy metal such as steel or lead, are formed with through-holes and are carried on the ends of the bolt 134. The head end of the bolt extends through weight 140, and the opposite end of the bolt is threaded into weight 142.

A spool-shaped bushing 144 (FIG. 10) has a pair of flanges 146, 146, flanking a smaller diameter center section 148. The bushing has a center bore with internal threads 150 engageable with external threads 151 formed on the upper portion of actuating shaft 78. The bushing 144 is loosely engaged with the base plate 152 of the coupling 128, being assembled through an open-ended slot 154. The vertical position of the bushing 144 on the shaft 78 is adjustable by the threaded connection which provides a very high degree of precision. The relative positions of the parts are adjusted and maintained by the lock nuts 156, 156.

An important feature is that the connection between the bushing 144 and the coupling 128 is loose in all transverse directions, but is substantially free of play in the axial direction. This accommodates any unavoidable misalignment as, for instance, in manufacture, between the solenoid armature 106 and the shaft 78, and prevents binding, yet holds the parts snugly assembled in the direction of the line of pull.

Another important feature is that the valve is readily convertible for normally-open or normally-closed operation without adding or discarding any parts.

In FIGS. 1 and 2, the valve 20 is assembled for normally-closed use.

In FIG. 1, the spool is biased, by spring 69 and weights 140, 142, to its normally-closed position. The spool in FIG. 1 is in its "first" or down position and, further, is disposed in its "obverse" or upright orientation. Here, the "first" land 64 blocks the inlet annular groove 44, and seals the intermediate wall portion 58 and the lower part of the upper wall portion 56, which flank the groove 44.

In FIG. 2, the spool is shown moved to its "second" or up position, pulled upward by actuation of the solenoid, against the bias of spring 69. Here, the valve is wide open and remains so as long as the solenoid is actuated.

To conver to a normally-open valve, the bottom closure member 34 and nut 86 are removed, the spool 62 is withdrawn through the bottom bore end portion 30. These same parts are then replaced, with the spool reversed end-for-end. The result is a normally-open valve as shown in FIG. 3. The spool is in its "first" or down position, and reversely oriented with respect to FIGS. 1 and 2. The valve in FIG. 3 is wide open, from inlet port 48, through the reduced diameter portion 68 of the spool, into the outlet port 50.

In FIG. 4, the valve, with the spool reversely oriented as shown in FIG. 3, is shown in its "second" or up position resulting from actuation of the solenoid. It is closed. Communication between the inlet port 48 and outlet port 50 (via outlet annular groove 46) is blocked by the first land 66; and communication between the inlet port 48 and outlet port 50 (via passageway 70) is blocked by the second land 66.

One application for solenoid-actuated spool valves is to open, as in FIGS. 2 and 3, or to close, as in FIGS. 1 and 4, when required to meet some emergency situation such as applying the brakes on a hoist, opening a mine door, or tilting back a partially-poured ladle of molten steel if the electric power supply fails. Under such an emergency situation, it is essential that no pressure differential exist across the valve spool 62 which would resist or prevent its opening or closing as required. The passageway 70 through the valve spool assures that no pressure differential can exist across the spool, and the vent 92 assures that, whatever uniform pressure is at the ends of the spool, it will be no higher than that in the outlet port 50.

In summary, the improved valve described and claimed herein is extremely dependable because of the following factors:

Pressure is balanced across the spool. Binding, due to misalignment between the actuating shaft and spool, and between the actuating shaft and solenoid, is prevented. Biasing weights augment the biasing spring. And the assembly is easily converted to normally-open or normally-closed operation without adding or discarding any parts.

It will be apparent that the embodiment shown is exemplary only and that various modifications can be made in the construction and arrangement within the scope of the invention as defined by the appended claims.

I claim as my invention:

1. In a convertible, solenoid-actuated, balanced spool valve including a casing having a valve bore and axially spaced annular grooves in the wall of said bore connected respectively with inlet and outlet ports, a valve spool having land means comprising a pair of axially spaced cylindrical lands sealably and slidably engaged with said wall within said bore and axially movable between two operative positions within said bore, biasing means urging said spool toward one of said operative positions, and solenoid means actuatable to move said spool toward the other of said operative positions, the improvement wherein:

said spool has a reduced diameter portion intermediate said lands, the axial length of said reduced diameter portion being sufficient to span both of said annular grooves and the portion of said wall therebetween to interconnect said inlet and outlet ports;

said spool being reversible within said bore and movable between said operative positions by said solenoid means in either obverse or reverse orientation;

said spool having its said land means disposed to block communication between said inlet and outlet ports in said first position with obverse orientation and in said second position with reverse orientation; and said spool having its said reduced diameter portion disposed to connect said inlet and outlet ports in said first position with reverse orientation, and in said second position with obverse orientation.

2. In a convertible solenoid-actuated, balanced spool valve, the combination of claim 1 in which one of said cylindrical lands on said spool seals a portion of said casing wall between said annular grooves both when said spool is in said first position with obverse orientation and when said spool is in said second position with reverse orientation.

3. In a convertible solenoid-actuated, balanced spool valve, the combination of claim 1 in which an elongated shaft, coaxial with said bore, is movable by said solenoid means and said spool is connectable to said shaft in either said obverse or said reverse orientation.

4. In a convertible solenoid-actuated, balanced spool valve, the combination of claim 1 in which each end portion of said spool is movable in a closed end portion of said bore in said casing, and a passageway is provided between said closed end portions of said casing to equalize pressure therebetween.

5. In a convertible solenoid-actuated, balanced spool valve, the combination of claim 1 in which an elongated shaft, movable by said solenoid means, extends through a central passageway in said spool, said passageway being oversize with respect to said shaft and open at the ends of said spool to equalize pressure in said casing at opposite ends of said spool, and said shaft is connected to the spool only at the ends thereof to eliminate binding of said spool in said bore caused by distortion between said shaft and spool.

6. In a convertible solenoid-actuated, balanced spool valve, the combination of claim 5 in which said spool is held on said shaft between retaining collars spaced along said shaft and abutting the respective ends of said spool, said spool having notch means at each end thereof beneath the corresponding collar and extending from said passageway to an area beyond said collar to enable fluid flowing through said passageway to bypass said collars.

7. In a convertible solenoid-actuated, balanced spool valve, the combination of claim 6 in which said collars and spool ends abut one another in planes which are substantially normal to the axes of said shaft and of said spool, to enable said shaft and spool to shift transversely in any direction relative to one another.

8. In a convertible solenoid-actuated, balanced spool valve, the combination of claim 1 in which each end portion of said spool is movable in a closed end portion of said bore in said casing and said spool has a passageway between the ends thereof, and said casing has a passageway between one of said closed end portions thereof and said outlet port, to equalize pressure between the ends of said spool and in said outlet port.

9. In a convertible solenoid-actuated, balanced spool valve, the combination of claim 1 in which said solenoid means is connected to said spool by means of a shaft extending through said casing at one end of said spool, gland means for sealing said casing around said shaft at said one end of said spool, said spool having a passageway extending therethrough to equalize pressure in said bore at opposite ends of said spool, and said casing having a pressure-equalizing passageway interconnecting said outlet port with said bore at the end of said spool opposite said one end.

10. In a convertible solenoid-actuated, balanced spool valve, the combination of claim 9 in which said biasing means comprises a combination of spring means within said bore acting between said casing and said spool, and weight means movable with said shaft externally of said casing.

11. In a convertible solenoid-actuated, balanced spool valve, the combination of claim 9 in which said solenoid means is connected with said shaft externally of said casing by coupling means enabling some transverse misalignment in all directions between said solenoid means and said shaft and substantially no relative movement therebetween in an axial direction.

12. A convertible, solenoid-actuated, balanced spool valve comprising:

a casing having a valve bore and first and second axially-spaced annular grooves in the wall of said bore; inlet and outlet ports connected respectively with said annular grooves, said casing having an access opening at one end of said bore and a removable closure for said opening;

a valve spool movable between first and second operative positions within said bore, said valve spool having first and second axially-spaced cylindrical lands flanking a reduced diameter portion and sealably and slidably engaged with the wall of said bore, said reduced diameter portion having an axial length sufficient to span both of said annular grooves and the portion of said wall therebetween to thereby interconnect said inlet and outlet ports;

spring means in said bore biasing said spool toward its said first position;

an actuating shaft extending through an end of said casing separate from said closure and being telescopically assembled within an axial passageway through said spool, said passageway interconnecting the opposite end portions of said bore to balance the pressure across said spool;

said casing having a vent connecting said outlet port with one of the end portions of said bore;

solenoid means supported on said casing and connected to said actuating shaft and effective when actuated to move said spool toward its said second position against the bias of said spring;

said spool being removable from said actuating shaft through said casing opening and being reversible on said shaft for movement between said first and second positions in either obverse or reverse orientation;

said spool having its said reduced diameter portion disposed to connect said inlet and outlet ports when said spool is in its first position and reversely oriented, and when said spool is in its second position and obversely oriented; and said spool having its said first land disposed to block passage of fluid from said first annular groove and to seal portions of said bore wall flanking said first annular groove when said spool is in its first position and obversely oriented; and said spool having its said first land disposed to block passage of fluid into said second annular groove and to seal portions of said bore wall flanking said second annular groove when said spool is in its said second position and reversely oriented, and said spool further having its said second land disposed to block passage of fluid from said inlet port to said axial passageway when said spool is in its said second position and reversely oriented.

* * * * *